US012322188B2

(12) United States Patent
Shah

(10) Patent No.: US 12,322,188 B2
(45) Date of Patent: Jun. 3, 2025

(54) SYSTEM AND METHOD OF CAPTURING AND PROCESSING EXTERIOR ENVIRONMENT OF A STRUCTURE VIA AN AUTONOMOUS VEHICLE

(71) Applicant: Nadeem Alam Shah, Mumbai (IN)

(72) Inventor: Nadeem Alam Shah, Mumbai (IN)

( * ) Notice: Subject to any disclaimer, the term of this patent is extended or adjusted under 35 U.S.C. 154(b) by 274 days.

(21) Appl. No.: 17/669,516

(22) Filed: Feb. 11, 2022

(65) Prior Publication Data

US 2022/0254163 A1 Aug. 11, 2022

(51) Int. Cl.
| | |
|---|---|
| *G06V 20/56* | (2022.01) |
| *G05D 1/00* | (2024.01) |
| *G06Q 50/16* | (2024.01) |
| *G06T 7/70* | (2017.01) |
| *G05D 105/80* | (2024.01) |
| *G05D 109/20* | (2024.01) |

(52) U.S. Cl.
CPC ............ *G06V 20/56* (2022.01); *G05D 1/101* (2013.01); *G06T 7/70* (2017.01); *G05D 2105/89* (2024.01); *G05D 2109/20* (2024.01); *G06Q 50/16* (2013.01); *G06T 2207/30252* (2013.01)

(58) Field of Classification Search
CPC . G06V 20/56; G06T 7/70; G06T 2207/30252; G05D 1/101; G05D 2105/89; G05D 2109/20; G06Q 50/16
USPC ............................................................ 701/4
See application file for complete search history.

(56) References Cited

U.S. PATENT DOCUMENTS

| | | | | |
|---|---|---|---|---|
| 6,084,978 A | * | 7/2000 | Taylor | H04N 13/189 |
| | | | | 348/E13.043 |
| 9,898,558 B1 | * | 2/2018 | Tofte | H04N 7/18 |
| 10,055,831 B2 | * | 8/2018 | Loveland | G06T 7/30 |
| 10,825,247 B1 | * | 11/2020 | Vincent | G06V 20/20 |
| 11,069,145 B1 | * | 7/2021 | Pearson | G06Q 40/02 |

(Continued)

FOREIGN PATENT DOCUMENTS

| | | | | |
|---|---|---|---|---|
| CN | 107807950 A | * | 3/2018 | G06F 16/13 |
| KR | 101769852 B1 | * | 8/2017 | |

OTHER PUBLICATIONS

Sreeram et al., "Virtual Design Review and Planning Using Augmented Reality and Drones," 2018 Second International Conference on Intelligent Computing and Control Systems (ICICCS), Madurai, India, 2018, pp. 915-918 (Year: 2018).*

*Primary Examiner* — Elaine Gort
*Assistant Examiner* — Preston Jay Miller
(74) *Attorney, Agent, or Firm* — Invention Matters, LLC; Edwin De Angel

(57) ABSTRACT

A system and a method of capturing and processing exterior environment of a structure via an autonomous vehicle are disclosed. The system receives location details, an elevation plan and a floor plan of a structure. The system prepares an image mapping plan for collecting images of the structure at each level. The system identifies a direction orientation for setting a Ground Control Point (GCP) at a base of the structure for operating an autonomous vehicle. The system employs the autonomous vehicle for capturing images of interior and exterior of the structure at each level by an image sensor of the autonomous vehicle. The system places icons mapping the images captured with the image mapping plan. The system accesses the images of the interior and exterior of the structure upon selecting the icons placed on the image mapping plan.

4 Claims, 7 Drawing Sheets

(56) References Cited

U.S. PATENT DOCUMENTS

| | | | | |
|---|---|---|---|---|
| 11,216,663 | B1* | 1/2022 | Ettinger | G05D 1/0016 |
| 11,783,385 | B1* | 10/2023 | Khosravan | G06Q 50/16 |
| | | | | 382/103 |
| 2013/0179841 | A1* | 7/2013 | Mutton | G06T 19/003 |
| | | | | 715/850 |
| 2017/0011477 | A1* | 1/2017 | Murphey | G06Q 50/16 |
| 2019/0147749 | A1* | 5/2019 | Lewis | G08G 5/0039 |
| | | | | 701/3 |
| 2019/0369648 | A1* | 12/2019 | Fang | G05D 1/106 |
| 2020/0019167 | A1* | 1/2020 | Alshamrani | G05D 1/101 |
| 2020/0103552 | A1* | 4/2020 | Phelan | G01S 13/95 |

* cited by examiner

SYSTEM AND METHOD OF CAPTURING AND PROCESSING EXTERIOR ENVIRONMENT OF A STRUCTURE VIA AN AUTONOMOUS VEHICLE

RELATED APPLICATIONS AND CLAIM FOR PRIORITY

The present application claims priority from an Indian Provisional Patent Application Ser. No. 202021054691 filed on Feb. 16, 2021, which is incorporated herein by its entirety and referenced thereto.

FIELD OF INVENTION

The present invention generally relates to capturing the exterior environment of high rise buildings using an autonomous vehicle. More specifically, the present invention relates to a system and a method of capturing an exterior environment of a high rise building for providing exterior or perspective views from every window and balconies from varied heights of the high rise building for enhancing real estate property transactions.

BACKGROUND OF THE INVENTION

Typical real estate transaction involves a potential buyer visiting a property physically to examine the property. The property includes an under-construction property or finished property that is ready to occupy. The buyer examines the property for certain features such as location, floor plan, interior structure, external views or perspective views, surroundings, amenities among others. If the property is a high rise building or skyscraper, then this poses a problem for the buyer. This is because; the high rise building includes several floors, each having multiple apartments or condominiums or flats having different features. It is difficult for the buyer to physically go to each floor and examine one or more apartments as it takes considerable time and effort. In some instances, it takes more than 12 months to complete construction of a property which delays the buyer to visit the property. This may leave the buyer with limited or no information about the property until the construction reaches a certain stage.

With advent in technology, several techniques have been employed to capture images or video of the property and share them with the potential buyer. Further, techniques have been employed to show a "virtual tour" of the interior and/or vicinity of the property. In the virtual tour, a series of images corresponding to the interior of the property are stitched together and are shown to the buyer. The virtual tour provides an interior view of the apartment to the buyer. The above techniques allow the buyer to obtain considerable details of the property.

Some of the techniques used were disclosed in the past. One such example is disclosed in a United States granted U.S. Pat. No. 10,062,205, entitled "Systems and methods for generating an interactive floor plan" ("the '205 patent"). The '205 patent discloses a computer-readable medium storing computer-executable instructions for generating a three-dimensional floor plan of a structure (e.g., a building, vehicle, or other structure) that includes a plurality of walls and at least one window. The three-dimensional floor plan includes internal building data such as height and orientation information for one or more rooms of the structure. The internal building data includes lighting elements and a view from the at least one window. The floor plan also includes external building data such as size, shape, location, and orientation of a second structure adjacent the first structure. The external building data includes points of interest and heavenly bodies. The system may allow a user to view the interior of a particular room and the exterior view from the particular room while manipulating the lighting conditions inside and/or outside of the particular room.

Another example is disclosed in a United States granted U.S. Pat. No. 10,977,493, entitled "Automatic location-based media capture tracking" ("the '493 patent"). The '493 patent discloses digital media assets depicting or otherwise representing portions of a property captured via a media capture device, such as an unmanned vehicle, at various locations about a property. A positioning receiver tracks the location of the media capture device when each digital media asset is captured. A computing device associated with either the media capture device itself or a network-connected server automatically generates location-based categories—such as "front side" or "rear side" or "living room"—automatically based on the plurality of locations so that each location-based category is associated with multiple digital media assets and their corresponding locations.

Yet another example is disclosed in a United States Publication No. 20180300552, entitled "Differential Tracking for Panoramic Images" ("the '552 Publication"). The '552 Publication discloses includes a method comprising creating, with a first 360 degree image capture device, a video while moving along a path within a building at a first time, extracting a plurality of first 360 degree photos from the video, deriving one or more of locations and orientations within the building for each of the plurality of first 360 degree photos, obtaining a plurality of second 360 degree photos at one or more positions in proximity to one or more points along the path at a second time later than the first time, and identifying differences between the first plurality of 360 degree photos and the second plurality of 360 degree photos. The plurality of second 360 degree photos has one or more common locations and orientations within the building as the plurality of first 360 degree photos.

Although the above discussed disclosures are useful, they have few limitations. For example, the existing disclosures use images of the property and provide limited information to the buyer. Further, some of the techniques provide three-dimensional views of the property. However, they do not provide external views from (individual apartment views from every window and balconies) the property for the buyer. As such, the existing techniques do not provide the buyer with complete information of the property to make informed decisions to make the purchase.

Therefore, there is a need for a system for capturing an exterior environment of a high rise building, which provides exterior and interior views from varied heights of the high rise building for providing complete information in order to enhance experience for the buyer in a real estate property transaction.

SUMMARY OF THE INVENTION

The problems in the existing art are met by a system and a method of capturing and processing an interior and exterior environment of a structure via an autonomous vehicle.

Accordingly, it is an object of the present invention to provide a system and a method for capturing interior and/or exterior environment of a high rise building for providing perspective views from varied heights of the high rise building for enhancing real estate property transactions.

It is another object of the present invention to provide a system for accurately presenting the exterior views of the structure which is under construction or prior to its construction with the help of proposed floor plan and provide complete details to the prospective buyer.

In order to achieve one or more of the objects as stated above, the present invention provides a system for capturing and processing an exterior environment of a structure via an autonomous vehicle. The system receives location details, an elevation plan and a floor plan of a structure such as a high rise building. The system prepares an image mapping plan for collecting images of the structure at each level. The system identifies a direction orientation for setting a ground control point (GCP) at a base of the structure for operating an autonomous vehicle. The system operates the autonomous vehicle vertically from the base to the top of the structure corresponding to the direction orientation. The system employs the autonomous vehicle for capturing images of interior and exterior of the structure at each level with the help of an image sensor of the autonomous vehicle. The system places icons mapping the images captured with the image mapping plan and substitutes the captured images to corresponding apartment on each floor of the structure. The system accesses the images of the interior and exterior of the structure upon selecting the icons placed on the image mapping plan.

The system uses the unmanned autonomous vehicle (UAV i.e., drone) on properties or high rise structures to capture images and panoramic videos of different views at each floor including direction and location windows and balconies from the ground-up to the top most level of the structure. The captured images are processed to align with the floor plan of the structure. The UAV captures images and video of the outer environment at different times of the day, morning, evening and midnight along with additional parameters including, but not limited to, ambient noise levels, prevalent wind direction and sunlight. The images are transmitted to a client device or user device. A user uses the client device to view the images transmitted and obtains perspective views of the outer environment from every window for each apartment in the structure.

In one advantageous feature of the present invention, the system sets Ground Control Points (GCPs) at a window as per approved plan. Further, the system sets Global navigation satellite system (GNSS) Real Time Kinematics (RTK) Base Stations by entering coordinates. By using GNSS and the GCP, the UAV achieves a high accuracy in positioning around the windows and helps to capture the images from desired angle and view.

In another advantageous feature of the present invention, the system places icons mapping the images captured with the image mapping plan. This helps the user to select the icons to access the images of the interior and exterior of the structure. The system provides the user with all internal and/or external views from the individual apartment e.g., from every window and balconies of the property. As such, the presently disclosed system provides the buyer with complete information of the property to make informed decisions to make the purchase.

Further advantages and examples of the invention will be brought out in the following part of the specification, wherein detailed description is for the purpose of fully disclosing the invention without placing limitations thereon.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION OF THE INVENTION

The following detailed description is intended to provide example implementations to one of ordinary skill in the art, and is not intended to limit the invention to the explicit invention, as one of ordinary skill in the art will understand that variations may be substituted that are within the scope of the invention as described.

Before the present features and working principle of a system for capturing and processing an exterior environment of a structure is described, it is to be understood that this invention is not limited to the particular system as described, since it may vary within the specification indicated. Various features for capturing and processing the exterior environment of a structure might be provided by introducing variations within the components/subcomponents disclosed herein. It is also to be understood that the terminology used in the description is for the purpose of describing the particular versions or embodiments only, and is not intended to limit the scope of the present invention, which will be limited only by the appended claims. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

Various features and embodiments of the system for capturing and processing an exterior environment of a structure are explained in conjunction with the description of FIGS. 1-7.

Figure 1:
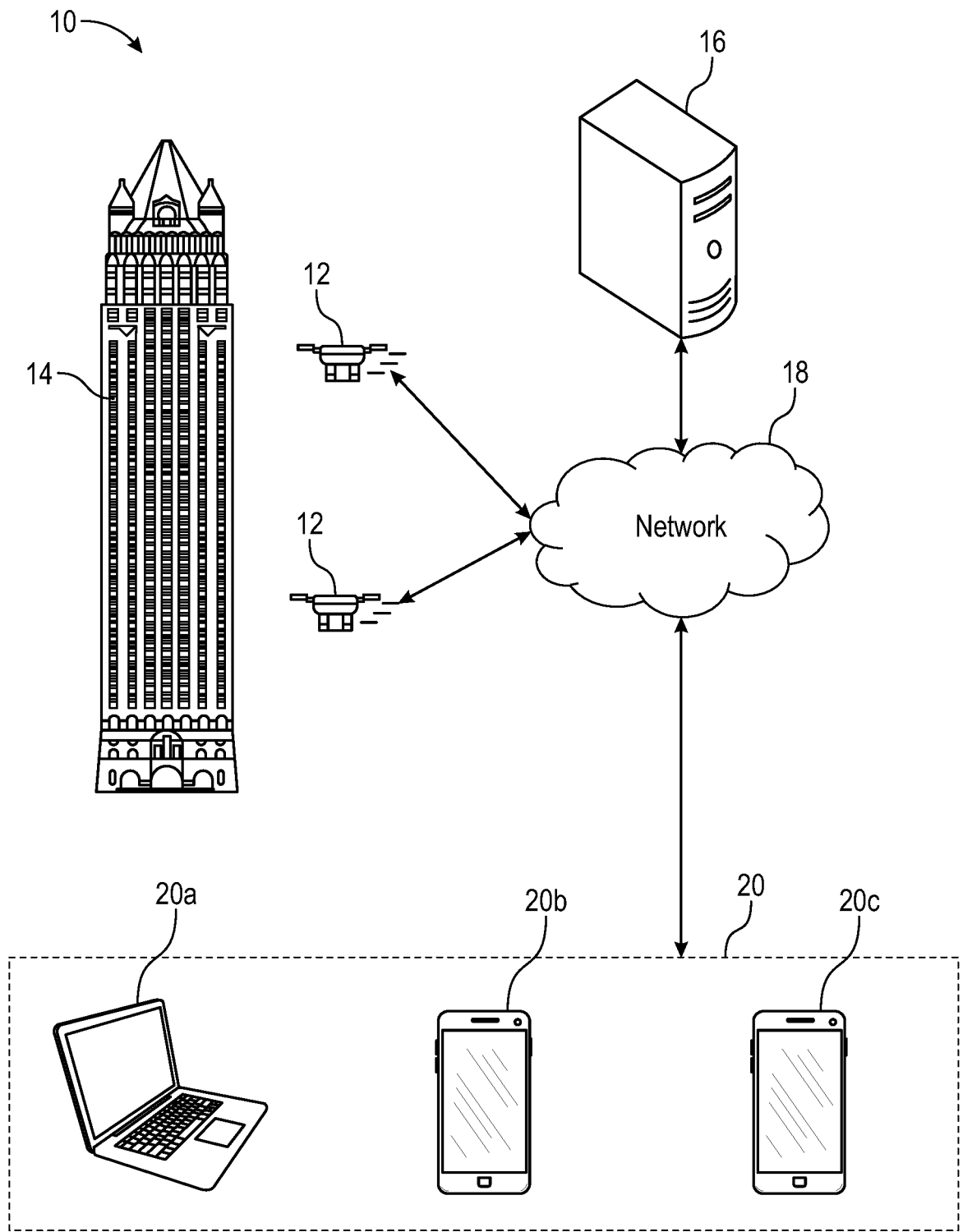
FIG. 1 an exemplary network communications system that allows to capture and process exterior environment of a structure, in accordance with one embodiment of the present invention.

The presently disclosed invention discloses a system for capturing and processing an exterior environment of a structure. FIG. 1 shows a high-level block diagram of an exemplary network communications system 10, in accordance with one embodiment of the present invention. For ease of reference, the network communications system 10 is referred to as system 10 throughout the description. The system 100 includes one or more unmanned autonomous vehicles, collectively called as unmanned autonomous vehicle (UAV) 12 (or simply autonomous vehicle 12 for ease of reference). The UAV 12 is also referred to as a drone or unmanned aerial vehicle (UAV). The UAV 12 hovers around a structure 14. Here, the structure 14 indicates a high rise building or skyscraper having multiple floors or levels. In one example, the UAV 12 communicatively connects to a server 16 via a network 18. The system 10 further includes one or more client devices such as client device 20a, client device 20b . . . client device 20c, collectively referred as client devices or simply client device 20.

Figure 2:
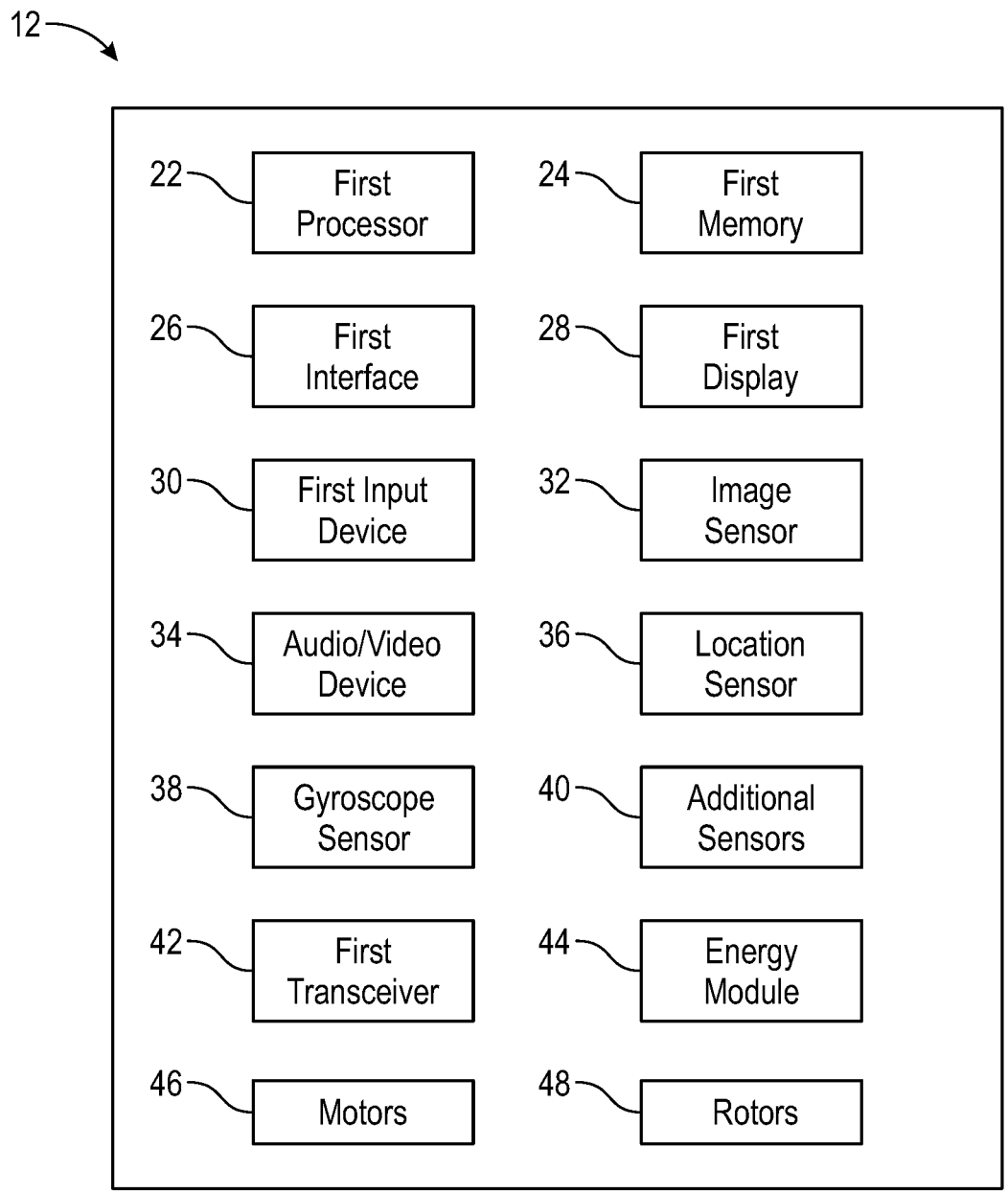
FIG. 2 illustrates a block diagram of an unmanned autonomous vehicle.

FIG. 2 shows a block diagram of the UAV 12, in accordance with one embodiment of the present invention. The UAV 12 comprises a first processor 22. The first processor 22 includes one or more commonly known CPUs such as microprocessor or microcontroller. It should be understood that the first processor 22 might be responsible for implementing specific functions under the control of software including an operating system, and any appropriate applications software.

The UAV 12 comprises a first memory 24 such as a volatile memory (e.g., RAM), non-volatile memory (e.g., disk memory, FLASH memory, EPROMs, etc.), unalterable memory, and/or other types of memory. In one implementation, the first memory 24 might be configured or designed to store data, program instructions. The program instructions might control the operation of an operating system and/or one or more applications.

The UAV 12 comprises first interface(s) 26. The first interface 26 includes wired interfaces and/or wireless interfaces. In at least one implementation, the first interface(s) 26 includes functionality similar to at least a portion of functionality implemented by one or more computer system interfaces such as those described herein and/or generally known to one having ordinary skill in the art.

The UAV 12 comprises first display(s) 28, implemented using LCD display technology, OLED display technology, and/or other types of conventional display technology.

The UAV 12 comprises first input device(s) 30. The first input device(s) 30 includes keyboard, buttons, scroll wheels, cursors, touchscreen sensors, audio command interfaces, magnetic strip reader, optical scanner, etc.

The UAV 12 comprises an image sensor 32. The image sensor 32 includes a camera capable of capturing still images or video. In one example, the image sensor 32 includes, but not limited to, an infrared (IR) camera and a night vision camera.

The UAV 12 comprises Audio/Video device(s) 34. The Audio/Video device(s) 34 includes components for providing/displaying audio/visual media. For example, the Audio/Video device(s) 34 includes cameras, speakers, microphones, media presentation components, wireless transmitter/receiver devices for enabling wireless audio and/or visual communication.

The UAV 12 comprises a location sensor 36, such as a Global Positioning System (GPS) sensor. The UAV 12 comprises a gyroscope sensor 38 configured for measuring or maintaining orientation and angular velocity of the UAV 12.

The UAV 12 comprises additional sensors 40. Here, additional sensors 40 include, but not limited to, accelerometers, wind sensors, collision avoidance sensor, heat sensor, hyperspectral image sensor, chemical sensor, heat sensor, radar, and pressure sensor amongst other sensors. In one example, the UAV 12 employs the hyperspectral image sensor to assess the condition of the structure 14. Here, the hyperspectral imaging allows collection of data on the material composition of objects in the field of view. The UAV 12 analyzes the material composition of elements in or near the structure 14 to detect damage, rust, and decay to parts of the structure 14. This helps to determine the condition or quality of the structure 14. The heat sensor helps to detect the temperature of different areas of the structure 14. The UAV 12 adjusts its own altitude using data from the pressure sensor to ensure that the data it is collecting for the structure 14 corresponds to data measured for a particular floor only and not any other floors. The UAV 12 also measures wind conditions near the structure 14 using the pressure sensor.

The UAV 12 comprises a first wireless communication module(s)/transceiver 42. The first transceiver 42 configures to communicate with external devices such as the server 16 and the client device 20 using one or more wireless interfaces/protocols such as, for example, 802.11 (Wi-Fi), 802.15 (including Bluetooth™), 802.16 (Wi-Max), 802.22, Cellular standards such as CDMA, CDMA2000, WCDMA, Radio Frequency (e.g., RFID), Infrared, laser, Near Field Magnetics, etc.

The UAV 12 includes an energy module 44. The energy module 44 includes, but not limited to, a battery, solar panel amongst other sources of renewable and nonrenewable energy to power the UAV 12. The UAV 12 comprises motors 46 operated by the energy module 44. The motor 44 operates rotors 48 that help to maneuver the UAV 12 in the air.

The server 16 includes a database comprising an application to execute functions for facilitating hybrid education delivery. In alternative embodiments, the server 16 operates as a standalone device or connects (e.g., networked) to other systems. Further, it should be understood that the server 16 implements in any different computing systems, environments, and/or configurations such as a workstation, an electronic device, a mainframe computer, a laptop, and so on. In a networked deployment, the server 16 might operate in the capacity of a server or a client machine in server-client network environment, or as a peer machine in a peer-to-peer (or distributed) network environment.

Figure 3:
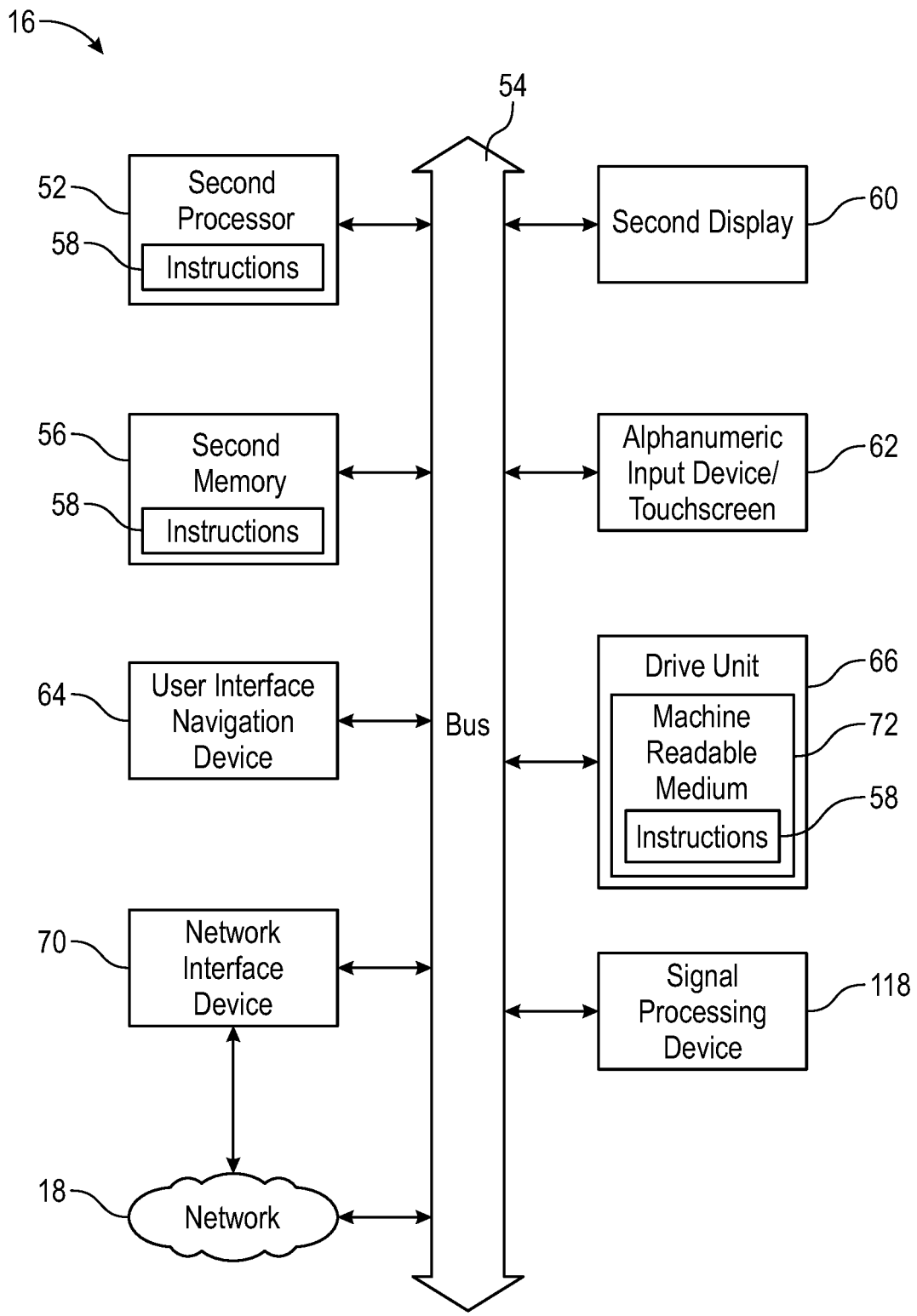
FIG. 3 illustrates a block diagram of a server.

FIG. 3 shows a diagrammatic representation of the server 16, in accordance with one embodiment of the present invention. The server 16 encompasses a second processor 52 (e.g., a central processing unit (CPU), a graphics processing unit (GPU), or both). The second processor 52 electrically couples by a data bus 54 to a second memory 56. The second memory 56 includes volatile memory and/or non-volatile memory. Preferably, the second memory 56 stores instructions or software program 58 that interact with the other devices such as UAV 12 and/or client device 20 as described below. In one implementation, second processor 52 executes instructions 58 stored in the second memory 56 in any suitable manner. In one implementation, the second memory 56 stores digital data indicative of documents, files, programs, web pages, etc. retrieved from one of UAV 12 and/or client device 20.

The server 16 further includes a second display 60 (e.g., a liquid crystal display (LCD) or a cathode ray tube (CRT)). The server 16 includes an input device (e.g., a keyboard) and/or touchscreen 62, a user interface (UI) navigation device 64 (e.g., a mouse), a drive unit 66, a signal processing device or signal generation device 118 (e.g., a speaker), and a network interface device 70.

The drive unit 66 includes machine-readable medium 72 on which one or more sets of instructions and data structures (e.g., software 58) is stored. It should be understood that the term "machine-readable medium" includes a single medium or multiple medium (e.g., a centralized or distributed database, and/or associated caches and servers) that stores one or more sets of instructions. The term "machine-readable medium" also includes any medium that is capable of storing, encoding, or carrying a set of instructions for execution by the machine and that cause the machine to perform any one or more of the methodologies of the present invention, or that is capable of storing, encoding or carrying data structures utilized by or associated with such a set of instructions. The term "machine-readable medium" accordingly includes, but not be limited to, solid-state memories, optical and magnetic media, and carrier wave signals.

The instructions 58 reside, completely or at least partially, within the second memory 56 and/or within the second processor 52 during execution thereof by the server 16. The network interface device 70 transmits or receives instructions 58 over the network 18 utilizing any one of a number of well-known transfer protocols.

The network 18 includes a wireless network, a wired network or a combination thereof. The network 18 can be implemented as one of the different types of networks, such as intranet, local area network (LAN), wide area network (WAN), the internet, and the like. The network 18 implements as a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, network 18 includes a variety of network devices, including routers, bridges, servers, computing devices, storage devices, and the like.

The client device 20 indicates an electronic device such as a mobile device, a personal digital assistant, a laptop computer, a tablet computer, a desktop computer etc. In the present invention, a user or a potential buyer of the structure 14 operates the client device 20 to obtain perspective views of the structure 14.

In one implementation, a user registers with the server 16 to receive information corresponding to the structure 14. As specified above, the user indicates a buyer interested to purchase a flat or apartment or condominium in the structure 14. Specifically, the user registers with the server 16 to receive the exterior environment of the structure 14. Here, the user registers by providing his name, address, contact information, price range of property, etc. Upon registering, the user requests the server 16 to provide information corresponding to the exterior environment of the structure 14.

Figure 4:
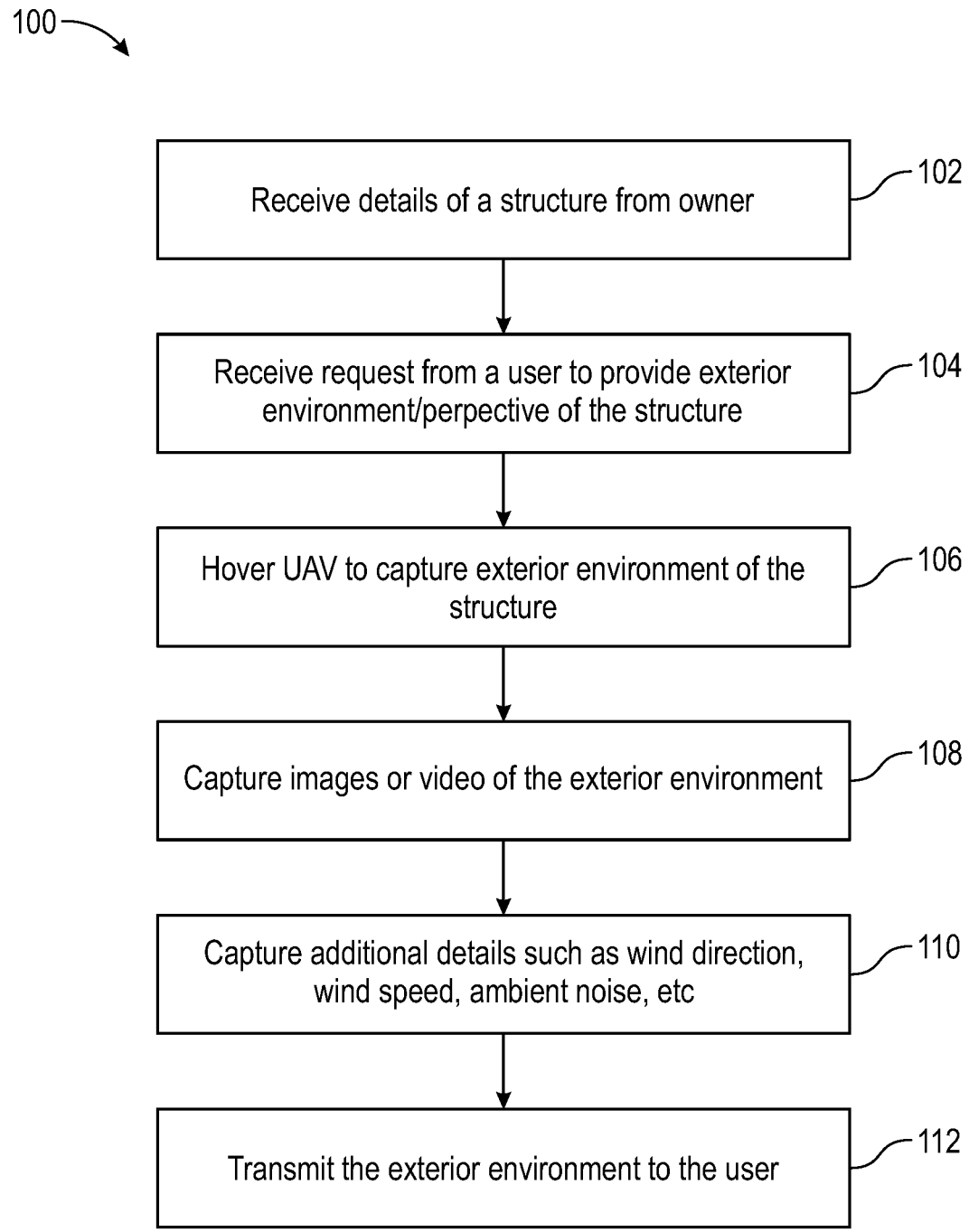
FIGS. 4, 5 and 6 illustrate methods of capturing and processing exterior environment of a structure, in accordance with one embodiment of the invention.

FIG. 4 illustrates a method 100 of capturing and processing exterior environment of a property via an autonomous vehicle, in accordance with one exemplary embodiment of the present invention. The order in which the method 100 is described should not be construed as a limitation, and any number of the described method blocks can be combined in any order to implement method 100 or alternate methods. Additionally, individual blocks may be deleted from the method 100 without departing from the scope of the invention described herein. Furthermore, the method 100 can be implemented in any suitable hardware, software, firmware, or combination thereof. However, for ease of explanation, in the embodiments described below, the method 100 may be implemented using the above-described server 16 and the UAV 12.

At first (step 102), the server 16 receives details of one or more structures 14. In one example, an owner or a middleman/broker/sales representative of the structure 14 provides the details of the structure 14 to the server 16. For example, the sales representative provides details of the structure 14 such as name of the structure 14, address, location coordinates, number of floors, number of apartments, financial details, number of windows/doors/balconies, etc. Here, the server 16 stores the list of structures 14 for providing the exterior environment of each structure 14 with the help of the UAV 12. After providing the details, the server 16 stores the details in the second memory 56.

A person skilled in the art understands that the server 16 allows for providing the exterior environment of the structure 14 based on pre-stored data or in real-time. In one implementation, the server 16 employs the UAV 12 to capture the exterior environment of the structure 14 and stores the data in the second memory 56. Subsequently, when the user requests for the exterior environment of the structure 14, the server 16 retrieves the data and transmits to the client device 20. In such implementation, the server 16 employs the UAV 12 to capture still images, panoramic video of the exterior environment of the structure 14 at different times of the day, say morning, evening and midnight (night vision camera) using the image sensor 32 and additional sensors 40. In one example, the UAV 12 captures the images and ambient noise and prevalent wind direction data at each floor i.e., from the ground up to the top most floor of the structure 14. As such, the UAV 12 captures the entire exterior environment (all sides and elevation) of the structure 14. As the UAV 12 captures all sides and elevation, this enables it to accurately capture each floor level accurately according as per the approved plan for windows and balcony of the particular structure 14. In another implementation, the server 16 receives a request from the user via the client device 20. Concurrently or consecutively, the server 16 engages the UAV 12 to capture the exterior environment of the structure 14 and transmit the images to the client device 20 in real time. The method 100 is explained considering that the server 16 engages the UAV 12 to capture the exterior environment of the structure 14 and transmit the images to the client device 20 in real time.

At step 104, the user requests the server 16 to provide the exterior environment of the structure 14. Here, the user provides details of the structure 14, such as name, location and/or other details of the structure 14. Subsequently, the server 16 instructs the UAV 12 to operate based on the details provided by the user. At step 106, the UAV 12 hovers or travels around the structure 14 to capture the exterior environment of the structure 14. In other words, the UAV 12 hovers around or ascends vertically coinciding with each window or apartment as per the plan of the high rise building or skyscraper. For example, consider the user has requested to view the exterior environment of the structure 14 from $15^{th}$ floor. Then, the first processor 22 employs the motor 46 to operate the rotors 48 to hover at the height of $15^{th}$ floor. Here, the first processor 22 controls the speed and angle at which the UAV 12 hovers around the structure 14. Upon reaching the required height i.e., $15^{th}$ floor, the first processor 22 employs the image sensor 32 to capture images or video from $15^{th}$ floor of the structure 14 (step 108). Here, the first processor 22 maneuvers the UAV 12 towards different areas such as windows, balconies, etc. In one example, the first processor 22 employs the location sensor 36, the gyroscope sensor 38 and additional sensors 40 to capture exterior environment of the structure 14. Here, the first processor 22 employs the location sensor 36, the gyroscope sensor 38 and additional sensors 40 to capture the exterior environment such as location coordinates, height, direction, wind speed, ambient noise, sunlight direction, surroundings of the structure 14 among other details (step 110).

Figure 7:
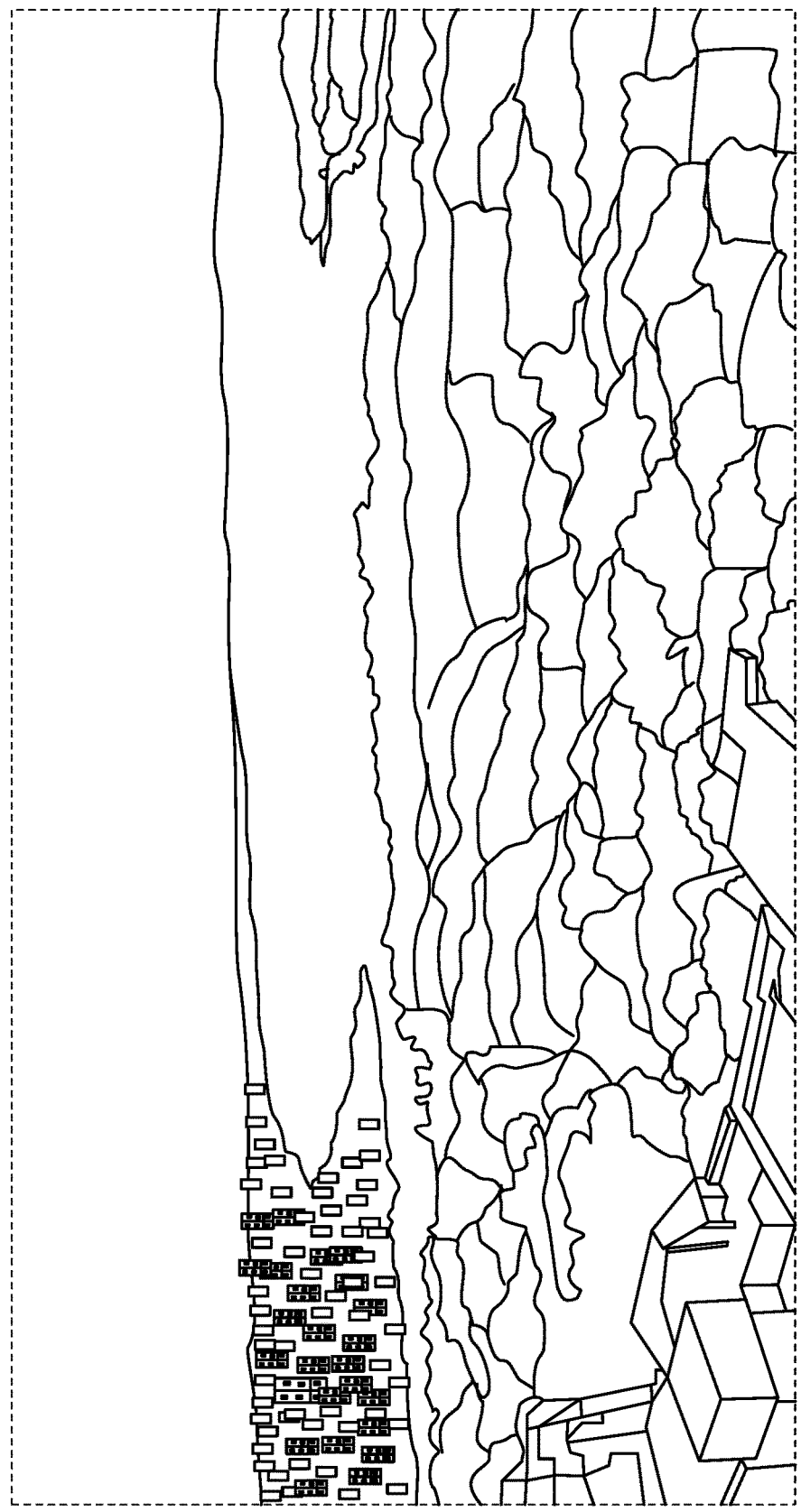
FIG. 7 illustrates an exemplary exterior environment displayed on a client device, in accordance with one embodiment of the present invention.

After capturing the exterior environment, the first processor 22 combines the images captured using artificial intelligence or any other software modules to create three dimensional images (virtual reality images) for enhancing the user's experience in viewing the exterior environment. A person skilled in the art understands either the UAV 12 or the server 16 employs the artificial intelligence or any other software modules to create VR images. The images created are then transmitted to the client device 20 using the first transceiver 42 via the server 16 (step 112). FIG. 7 shows a screenshot 400 of an exemplary the exterior environment transmitted and displayed on the client device 20, in accordance with one embodiment of the present invention. A person skilled in the art understands that the user requests the server 16 to provide exterior environment from another angle/side. Subsequently, the server 16 transmits the request to the UAV 12. The UAV 12 changes its angle and/or height to provide a different view of the exterior environment of the structure 14. For example, if the user wishes to view the exterior environment from $22^{nd}$ floor, then the UAV 12 hovers to $22^{nd}$ floor from $15^{th}$ floor and captures the images. Subsequently, the UAV 12 transmits the images to the client device 20 via the server 16 as explained above. This way, the user obtains perspective view of the outer environment from every window/side for each apartment in the structure 14.

Figure 5:
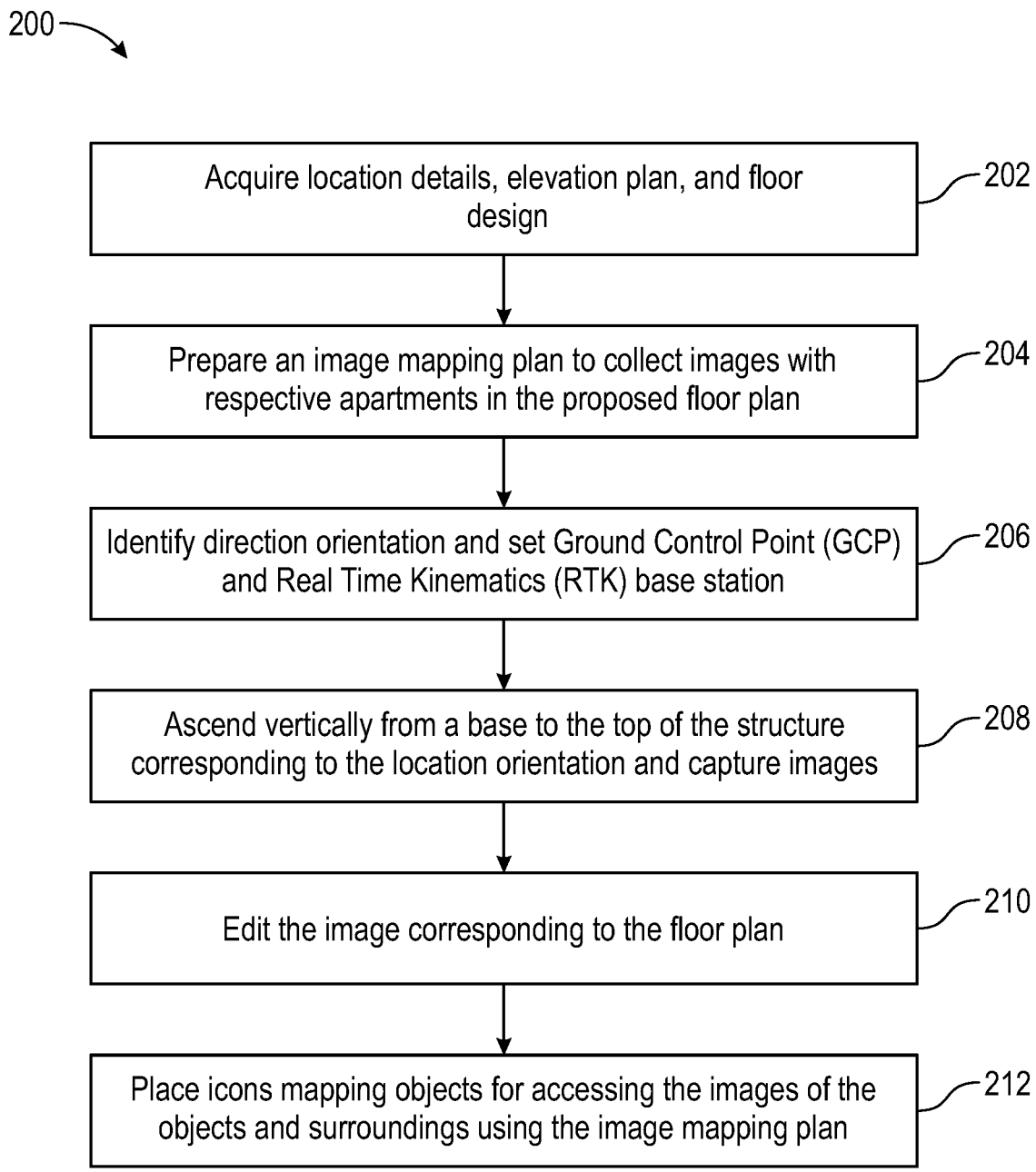

FIG. 5 illustrates a method 200 of capturing and processing an exterior environment of a property via an autonomous vehicle, in accordance with another exemplary embodiment of the present invention. The order in which the method 200 is described should not be construed as a limitation, and any number of the described method blocks can be combined in any order to implement method 200 or alternate methods. Additionally, individual blocks may be deleted from the method 200 without departing from the scope of the invention described herein. Furthermore, the method 200 can be implemented in any suitable hardware, software, firmware, or combination thereof. However, for ease of explanation, in the embodiments described below, the method 200 may be implemented using the above-described server 16 and the UAV 12.

At step 202, server 16 acquires location details, elevation plan, and floor plan of the property. In one example, server 16 acquires the location details, the elevation plan, and the floor design of the property in various formats such as Computer-aided design in two-dimensional (2D) and/or three-dimensional (3D) format. Subsequently, server 16 prepares an image mapping plan to collate images with respective apartments or individual flats in the proposed floor plan (to form a continuous and single image of the structure), as shown at step 204. Here, the image mapping plan indicates a directory structure in which the captured images are stored and later linked to the respective windows on each apartment on every floor i.e., each level of the proposed high rise structure.

Further, server 16 identifies location orientation with respect to the direction (i.e., North 0 Degrees) and Global Positioning System (GPS) coordinates as per the proposed plan (Step 206). Subsequently, server 16 sets ground control points (GCPs) at the corresponding window as per approved plan (step 206). GCPs are points on the ground with known coordinates used for accurately mapping large areas. Alternatively, server 16 sets Real Time Kinematics (RTK) Base Stations by entering coordinates and placing RTK mounted on a tripod (not shown), and measures distance between the marker to the device and antenna. A person skilled in the art understands that RTK base stations are Global navigation satellite system (GNSS) receivers that act as a reference station in an RTK setup. Together with other GNSS Receivers, the UAV 12, a high accuracy in positioning measurements is achieved. RTK base stations create an RTK correction signal which improves the positioning of the UAV 12. RTK Base stations stay in contact with the server 16 by wireless communication. Alternatively, server 16 sets a ground control point and base-station for the UAV 12 on a window at the ground floor starting from the right side of the proposed building entrance to move in a clockwise direction.

At step 208 of method 200, server 12 controls the UAV 12 to start the process of image capturing utilizing from the first window at the ground floor. Here, the UAV 12 ascends vertically from the base to top of the structure corresponding to the location orientation and captures images. Specifically, the UAV 12 ascends vertically up to the height of the proposed high-rise with stops at every floor. At each stop at every floor, the UAV 12 captures images as per the height specified in the proposed floor plan. After capturing images for the series of windows vertically, for the entire series of windows of the proposed high rise, the UAV 12 repeats the process of capturing images of adjacent windows, say a second window at each floor, moving clockwise or anti-clockwise depending on the need.

Figure 6:
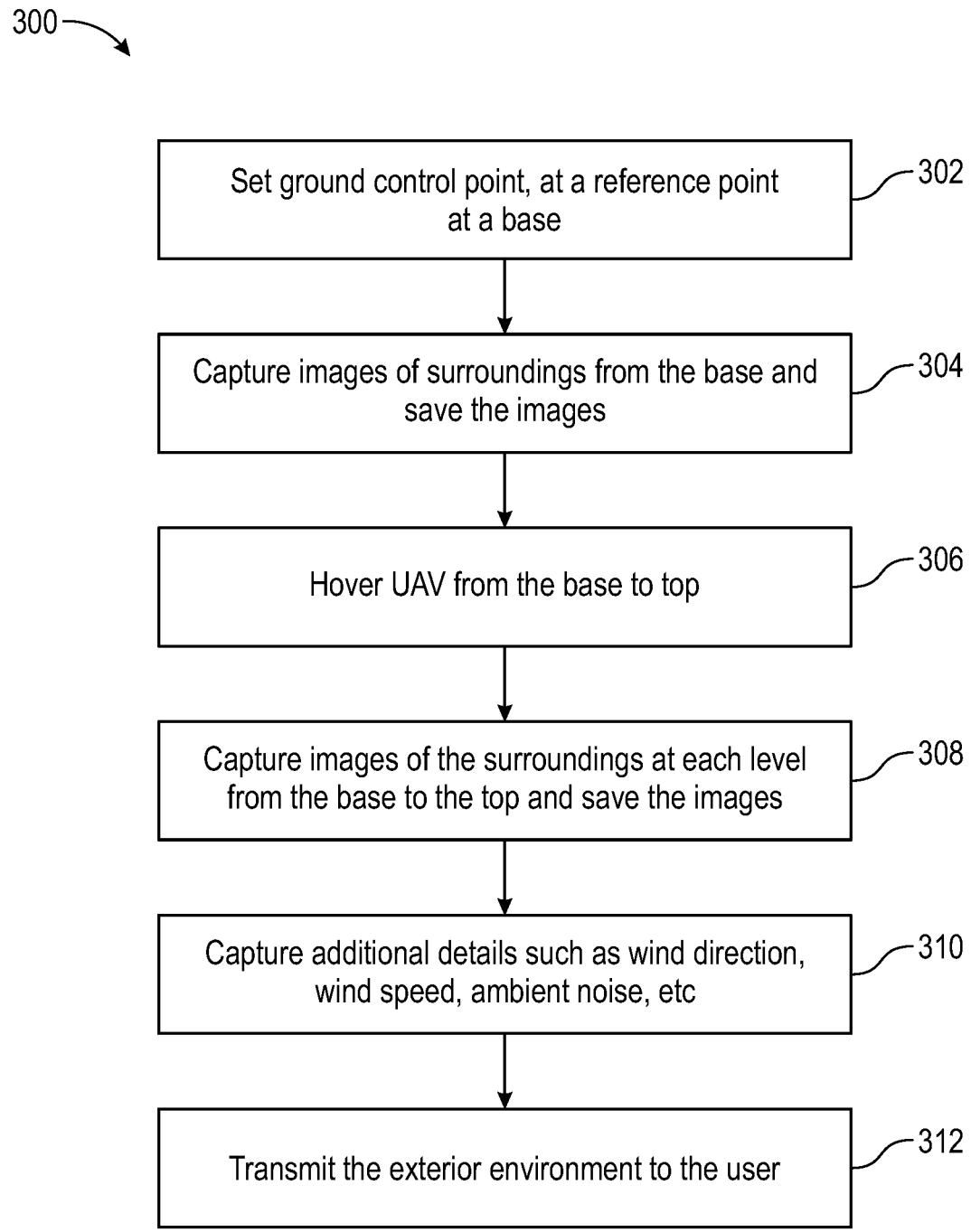

FIG. 6 illustrates a method 300 of setting ground control points (GCPs) at the corresponding window and capturing of images (steps 206 and 208) at each floor, in accordance with another exemplary embodiment of the present invention. The order in which the method 300 is described should not be construed as a limitation, and any number of the described method blocks can be combined in any order to implement method 300 or alternate methods. Additionally, individual blocks may be deleted from the method 300 without departing from the scope of the invention described herein. Furthermore, the method 300 can be implemented in any suitable hardware, software, firmware, or combination thereof. However, for ease of explanation, in the embodiments described below, the method 300 may be implemented using the above-described server 16 and the UAV 12.

At step 302, the GCP is set for UAV 12 at a reference point at a base i.e., ground. In one example, a window at the ground floor is considered as the reference point. Consider that a first window at the ground of the structure facing east is considered as the reference point. Further, the UAV 12 captures images starting from the first window and transmits the images to the server 16 (step 304). The server 16 saves the images as a first image in the second memory 56. Further, the UAV 12 hovers from the base to the top in that UAV 12 goes from the ground floor to first floor, then first floor to second floor and so on, as shown at step 306. At each floor, the UAV 12 captures the images. Here, the image captured at the first floor is saved as a second image, the image captured at the second floor is saved as a third image and so on. Similarly, the UAV 12 captures the images of the surroundings at each floor and the image is saved as unique image references say the images are numbered chronologically corresponding to the floor, as shown at step 308. It should be understood that the surroundings include both interior and exterior environment of the structure at each floor.

Subsequently, the server 16 employs the UAV 12 to move to the west direction and capture the images starting from the ground floor until the top. Assuming that there are ten (10) floors in the structure including the ground floor, then server 16 saves the images in continuation from the east facing windows. This way the unique image references are maintained for easy storage in the second memory 56. For example, the image of the east facing window of the ground floor is saved as the first image and the image of the west facing window of the ground floor is saved as the eleventh floor in the second memory 56. Similarly, the image of the east facing window of the ninth floor is saved as the tenth image and the image of the west facing window of the ninth floor is saved as the twentieth image in the second memory 56.

In one example, the UAV 12 captures additional details such as wind direction, wind speed, ambient noise, etc., as shown at step 310. Here, the UAV 12 utilizes a variety of sensors for capturing the details. For example, the UAV 12 utilizes a wind direction sensor (not shown) to capture the wind direction. In another example, the UAV 12 utilizes an anemometer to detect the wind speed while the UAV 12 is at a certain floor. In another example, the UAV 12 utilizes a noise sensor to detect the ambient noise while the UAV 12 is at a certain floor. After capturing the additional details, the details are transmitted to the server 16. Whenever the user accesses the server 16, the server 16 transmits the images i.e., both interior and exterior environment of the structure to the user on the user device 20 (step 312).

Now referring back to FIG. 5, when the UAV 12 transmits the images captured to the server 16, the server 16 edits the images for color corrections and crops as needed depending upon the floor plan, as shown at step 210. In one example, the server 16 utilizes custom built image enhancement algorithms to edit the images. In another example, the server 16 utilizes commercially available tools such as Adobe Premium Rush™ or Photoshop™ or other tools to edit the images. After editing the images, the server 16 replicates the floor plan of each apartment on a webpage and places icons with a hyperlink on each window of the replica of the floor plan (step 212). It should be understood that the server 12 places icons on the objects such as windows, doors, rooms, and also the surroundings of the structure. The icons are placed such that when the user accesses the server 16 and clicks an icon, a corresponding image of the surrounding and/or window/door/floor is shown to the user on his/her user device 20. For example, if the icon on the first window of the ground floor apartment is clicked, then the image mapped to the first window using an image mapping plan is displayed to the user on the user device 20. FIG. 7 shows the screenshot 400 of the image displayed on the client device 20, in accordance with one embodiment of the present invention.

Although the above description is explained considering that the system 10 is used to capture the exterior environment of the structure 14 such as a high rise building, the present invention can be used in other applications. For example, the system 10 can be used to scan defects in a windmill (wind blades) for maintaining the windmill. In another example, the system 10 can be used to capture the exterior environment of a destination (customer location) in order to deliver a package ordered online (drone delivery) by the customer. Here, the server 16 instructs the UAV 12 to travel to the location of the customer and then hover next to the window or balcony (say $15^{th}$ floor) of the customer to deliver the package based on the address provided by the customer. In another example, the UAV 12 is used to perform repair or perform specific jobs from outside of the structure 14 say spraying paint, putting off fire in a particular floor, etc.

Based on the above, it is evident that the system uses the unmanned autonomous vehicle (drone) on properties or high rise structures to capture images and panoramic videos of different views at each floor including direction and location windows and balconies from the ground-up to the top most level of a particular high rise building. The captured images are processed to align with the floor plan of the building. The unmanned autonomous vehicle captures images and video of the outer environment at different times of the day, morning, evening and midnight along with additional parameters including, but not limited to, ambient noise levels, prevalent wind direction and sunlight. Thus, a user obtains perspective views of the exterior and interior environment from every window for each apartment in the building.

The presently disclosed server provides several advantages over the prior art. The server utilizes the GCPs to mark the starting points for the UAV. The server further utilizes GNSS RTK positioning the UVA to capture the images. This enables the UAV to capture true exterior images with precision. When compared with existing techniques which utilize 3D models of the exterior environment, the presently disclosed server does not depend on the 3D modelling of the exterior environment. Rather, it utilizes GCPs to capture the direction/starting point and GNSS for positioning the UAV to accurately capture the environment of the structure at every level which is not disclosed in any of the existing art.

In the above description, numerous specific details are set forth such as examples of some embodiments, specific components, devices, methods, in order to provide a thorough understanding of embodiments of the present invention. It will be apparent to a person of ordinary skill in the art that these specific details need not be employed, and should not be construed to limit the scope of the invention.

In the development of any actual implementation, numerous implementation-specific decisions must be made to achieve the developer's specific goals, such as compliance with system-related and business-related constraints. Such a development effort might be complex and time consuming, but may nevertheless be a routine undertaking of design, fabrication, and manufacture for those of ordinary skill. Hence as various changes could be made in the above constructions without departing from the scope of the invention, it is intended that all matter contained in the above description or shown in the accompanying drawings shall be interpreted as illustrative and not in a limiting sense.

The foregoing description of embodiments is provided to enable any person skilled in the art to make and use the invention of the present disclosure. Various modifications to these embodiments will be readily apparent to those skilled in the art, and the novel principles and invention disclosed herein may be applied to other embodiments without the use of the innovative faculty. It is contemplated that additional embodiments are within the true scope of the disclosed invention.

What is claimed is:

1. A method of capturing and processing images of interior and exterior environment of a structure via an autonomous vehicle, the method comprising steps of:
   acquiring, by a processor, location details, an elevation plan and a floor plan of the structure;
   preparing, by the processor, an image mapping plan for collecting images of the structure at each level based on the location details, the elevation plan and the floor plan of the structure;
   identifying, by the processor, a direction orientation of the structure for setting a Ground Control Point (GCP) at a base of the structure for operating the autonomous vehicle based on the image mapping plan;
   positioning, by the processor, the autonomous vehicle by setting a Real Time Kinematics (RTK) base station at the Ground Control Point (GCP) at the base of the structure;
   operating, by the processor, the autonomous vehicle vertically from the base to the top of the structure corresponding to the direction orientation;

employing, by the processor, the autonomous vehicle for capturing images of interior and exterior of the structure at each level by an image sensor of the autonomous vehicle based on the image mapping plan, wherein the image mapping plan indicates a directory structure in which the images are stored and linked at each level of the structure, and wherein the autonomous vehicle is employed for capturing details corresponding to wind direction, wind speed, and ambient noise at each level of the structure;

editing, by the processor, the images for color corrections;

cropping, by the processor, the images for adjusting the direction orientation corresponding to the floor plan, wherein the images are collated forming a single and continuous image of the structure;

placing, by the processor, icons by mapping the images captured with the image mapping plan; and accessing, by the processor, the images of the interior and exterior of the structure and details corresponding to wind direction, wind speed, and ambient noise at each level of the structure upon selecting the icons placed on the image mapping plan.

2. The method of claim 1, further comprising transmitting, by the processor, the images of the interior and exterior of the structure to a user device.

3. A system for capturing and processing images of interior and exterior environment of a structure via an autonomous vehicle, the system comprising:

a memory; and a processor coupled to the memory, wherein the processor executes program instructions stored in the memory, to:

receive location details, an elevation plan and a floor plan of the structure;

prepare an image mapping plan for collecting images of the structure at each level based on the location details, the elevation plan and the floor plan of the structure;

identify a direction orientation of the structure for setting a Ground Control Point (GCP) at a base of the structure for operating the autonomous vehicle based on the image mapping plan;

positioning the autonomous vehicle by setting a Real Time Kinematics (RTK) base station at the Ground Control Point (GCP) at the base of the structure;

operate the autonomous vehicle vertically from the base to the top of the structure corresponding to the direction orientation;

employ the autonomous vehicle for capturing images of interior and exterior of the structure at each level by an image sensor of the autonomous vehicle based on the image mapping plan, wherein the image mapping plan indicates a directory structure in which the images are stored and linked at each level of the structure, and wherein the autonomous vehicle is employed for capturing details corresponding to wind direction, wind speed, and ambient noise at each level of the structure;

editing the images for color corrections;

cropping the images for adjusting the direction orientation corresponding to the floor plan, wherein the images are collated forming a single and continuous image of the structure;

place icons to map the images captured with the image mapping plan; and access the images of the interior and exterior of the structure and details corresponding to wind direction, wind speed, and ambient noise at each level of the structure upon selecting the icons placed on the image mapping plan.

4. The system of claim 3, wherein the processor executes the program instructions to transmit the images of the interior and exterior of the structure to a user device.

* * * * *